United States Patent Office 3,069,428
Patented Dec. 18, 1962

3,069,428
PYRIDINE QUATERNARY COMPOUNDS
John T. Fitzpatrick, Charleston, George W. Fowler, South Charleston, and Erich Marcus, Charleston, W. Va., assignors to Union Carbide Corporation, a corporation of New York
No Drawing. Filed Dec. 27, 1960, Ser. No. 78,243
6 Claims. (Cl. 260—297)

This invention relates to pyridine quaternary compounds as new compositions of matter, and to processes for their production.

The novel pyridine quaternary compounds of the instant invention can be graphically depicted by the formula:

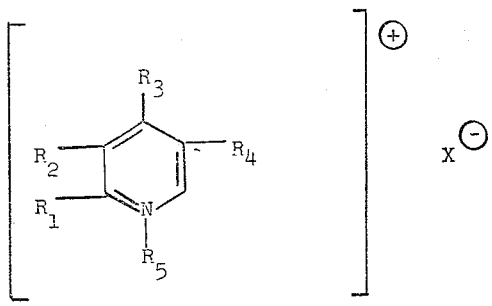

wherein X is a halogen radical, preferably a chlorine radical; $R_1$, $R_2$, $R_3$ and $R_4$ are members selected from the group consisting of hydrogen and alkyl radicals having from one to twelve carbon atoms, preferably from one to four carbon atoms; and $R_5$ is a radical having the structure:

$$-CH_2CH=CHCH_2CH_2OR_6$$

or

wherein $R_6$ is an alkyl radical having from one to twenty carbon atoms, preferably from one to fifteen carbon atoms. Illustrative of the novel pyridine quaternary compounds of the instant invention is 1-(5-decoxy-2-pentyl)-2-methyl-5-ethylpyridinium chloride which can be represented by the formula

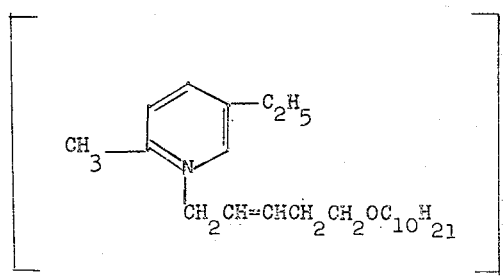

and such compounds as 1-(5-methoxy-2-pentenyl)-2-methyl - 5 - ethylpyridinium chloride,
1-[5-(2-ethylbutoxy)-2-pentenyl] - 2 - methyl-5-ethylpyridinium chloride.
1-[5-(2-ethylhexoxy) - 2 - pentyl]-2-methyl-5-ethylpyridinium chloride,
1-(5-ethoxy-2-pentyl)-2-methyl - 5 - ethylpyridinium chloride,
1-{5-[4-(2,6,8-trimethylnonoxy)] - 2-pentenyl}-2-methyl-5-ethylpyridinium chloride,
1-(5-decoxy-2-pentenyl)pyridinium chloride,
1-(5-methoxy-2-pentenyl)pyridinium chloride,
1-[5-(2-ethylbutoxy)-2-pentenyl]pyridinium chloride,
1-[5-(2-ethylhexoxy)-2-pentenyl]pyridinium chloride,
1-(5-ethoxy-2-pentenyl)pyridinium chloride,
1-(5-dodecoxy-2-pentenyl)pyridinium chloride,
1-(5-hexadecoxy-2-pentenyl)pyridinium chloride,
1-(5-heptadecoxy-2-pentenyl)pyridinium chloride,
1-(5-eicosoxy-2-pentenyl)pyridinium chloride,
1-(5-decoxy-2-pentenyl)-2-methylpyridinium chloride,
1-(5-methoxy-2-pentenyl)-2-methylpyridinium chloride,
1-[5-(2-ethylbutoxy)-2 - pentenyl] - 2 - methylpyridinium chloride,
1-[5-(2-ethylhexoxy) - 2 - pentenyl]-2-methylpyridinium chloride,
1-(5-ethoxy-2-pentyl)-2-methylpyridinium chloride,
1-(5-dodecoxy-2-pentenyl)-2 - methylpyridinium chloride,
1-(5 - hexadecoxy - 2 - pentenyl) - 2 - methylpyridinium chloride,
1-(5-heptadecoxy - 2 - pentenyl) - 2 - methylpyridinium chloride,
1-(5-eicosoxy-2-pentenyl)-2-methylpyridinium chloride,
1-(5-decoxy-2-pentenyl)-3-methylpyridinium chloride,
1-(5-methoxy-2-pentenyl)-3-methylpyridinium chloride,
1-[5-(2-ethylbutoxy)-2-pentenyl] - 3 - methylpyridinium chloride,
1-[5-(2-ethylhexoxy)-2-pentenyl] - 3 - methylpyridinium chloride,
1-(5-ethoxy-2-pentenyl)-3-methylpyridinium chloride,
1-(5-dodecoxy-2-pentenyl)-3-methylpyridinium chloride,
1-(5 - hexadecoxy - 2 - pentenyl) - 3 - methylpyridinium chloride,
1-(5-heptadecoxy-2-pentenyl) - 3-methylpyridinium chloride,
1-(5-eicosoxy-2-pentenyl)-3-methylpyridinium chloride,
1-(5-decoxy-2-pentenyl)-4-methylpyridinium chloride,
1-(5-methoxy-2-pentenyl)-4-methylpyridinium chloride,
1-[5-(2-ethylbutoxy)-2-pentenyl] - 4 - methylpyridinium chloride,
1-[5-(2-ethylhexoxy) - 2 - pentenyl]-4-methylpyridinium chloride,
1-(5-ethoxy-2-pentenyl)4-methylpyridinium chloride,
1-(5-dodecoxy-2-pentenyl) - 4-methylpyridinium chloride,
1-(5-hexadecoxy - 2 - pentenyl) - 4 - methylpyridinium chloride,
1-(5-heptadecoxy-2-pentenyl) - 4-methylpyridinium chloride.
1-(5-eicosoxy-2-pentenyl)-4-methylpyridinium chloride,
1-(5-decoxy-2-pentenyl)-2,5-dimethylpyridinium chloride,
1-(5-methoxy-2-pentenyl) - 2,5-dimethylpyridinium chloride,
1-[5-(2-ethylbutoxy)-2-pentenyl] - 2,5 - dimethylpyridinium chloride,
1-[5-(2-ethylhexoxy) - 2 - pentenyl]-2,5-dimethylpyridinium chloride,
1-(5-ethoxy-2-pentenyl)-2,5-dimethylpyridinium chloride,
1-(5-dodecoxy - 2 - pentenyl) - 2,5 - dimethylpyridinium chloride,
1-(5 - hexadecoxy-2-pentenyl) - 2,5 - dimethylpyridinium chloride,
1-(5-heptadecoxy-2-pentenyl) - 2,5 - dimethylpyridinium chloride,
1-(5-eicosoxy-2-pentenyl) - 2,5-dimethylpyridinium chloride,
1-(5-decoxy-2-pentenyl)-3,5-dimethylpyridinium chloride,
1-(5-methoxy - 2 - pentenyl) - 3,5 - dimethylpyridinium chloride,
1-[5-(2-ethylbutoxy)-2-pentenyl] - 3,5 - dimethylpyridinium chloride,
1-[5-(2-ethylhexoxy)-2-pentenyl]-3,5-dimethylpyridinium chloride,
1-(5-ethoxy-2-pentenyl)-3,5-dimethylpyridinium chloride,
1-(5-dodecoxy - 2 - pentenyl) - 3,5 - dimethylpyridinium chloride, 1-(5 - hexadecoxy-2-pentenyl) - 3,5 - dimethylpyridinium chloride,
1-(5-heptadecoxy-2-pentenyl) - 3,5 - dimethylpyridinium chloride,
1-(5-eicosoxy-2-pentenyl)-3,5 - dimethylpyridinium chloride,
1-(5-decoxy-2-pentenyl)-2,4-dimethylpyridinium chloride,
1-(5 - methoxy-2-pentenyl)-2,4-dimethylpyridinium chloride,
1-[5-(2-ethylbutoxy) - 2 - pentenyl]-2,4-dimethylpyridinium chloride,
1-[5-(2-ethylhexoxy)-2-pentenyl] - 2,4 - dimethylpyridinium chloride,
1-(5-ethoxy-2-pentenyl)-2,4-dimethylpyridinium chloride,
1-(5 - dodecoxy - 2 - pentenyl) - 2,4-dimethylpyridinium chloride,
1-(5 - hexadecoxy - 2 - pentenyl)-2,4-dimethylpyridinium chloride,
1-(5-heptadecoxy - 2 - pentenyl) - 2,4-dimethylpyridinium chloride,
1-(5-eicosoxy - 2 - pentenyl)-2,4-dimethylpyridinium chloride,
1-(5-decoxy-2-pentenyl) - 4-n-propylpyridinium chloride,
1-(5-methoxy-2-pentenyl)-4-n-propylpyridinium chloride,
1-[5-(2-ethylbutoxy) - 2-pentenyl]-4-n-propylpyridinium chloride,
1 - [5-(2-ethylhexoxy)-2-pentenyl]-4-n-propylpyridinium chloride,
1-(5-ethoxy-2-pentenyl)-4-n-propylpyridinium chloride,
1-(5-dodecoxy-2-pentenyl)-4-n-propylpyridinium chloride,
1 - (5 - hexadecoxy - 2 - pentenyl)-4-n-propylpyridinium chloride,
1 - (5 - heptadecoxy - 2 - pentenyl)-4-n-propylpyridinium
1-(5-eicosoxy-2-pentenyl)-4-n-propylpyridinium chloride,
1 - (5 - decoxy - 2 - pentenyl)-2-methyl-5-n-butylpyridinium chloride,
1 - (5 - methoxy - 2-pentenyl)-2-methyl-5-n-butylpyridinium chloride,
1 - [5 - (2 - ethylbutoxy) - 2 - pentenyl] - 2 - methyl - 5-n-butylpyridinium chloride,
1 - [5 - (2 - ethylhexoxy) - 2 - pentenyl] - 2 - methyl - 5-n-butylpyridinium chloride,
1 - (5 - ethoxy - 2 - pentenyl) - 2 - methyl - 5 - n - butylpyridinium chloride,
1 - (5 - dodecoxy - 2 - pentenyl) - 2 - methyl - 5 - n - butylpyridinium chloride,
1 - (5 - hexadecoxy - 2 - pentenyl) - 2 - methyl - 5 - n-butylpyridinium chloride,
1 - (5 - heptadecoxy - 2 - pentenyl) - 2 - methyl - 5 - n-butylpyridinium chloride,
1 - (5 - eicosoxy - 2 - pentenyl) - 2 - methyl - 5 - n - butylpyridinium chloride,
1-(5-decoxy-2-pentenyl)-3-hexylpyridinium chloride,
1-(5-decoxy-2-pentenyl)-3-ethylpyridinium chloride,
1-(5-methoxy-2-pentenyl)-2-octylpyridinium chloride,
1-(5-methoxy-2-pentenyl)-4-isopropylpyridinium chloride,
1-(5-ethoxy-2-pentenyl)-4-dodecylpyridinium chloride,
1-(5-dodecoxy-2-pentenyl)-2,5-dihexylpyridinium chloride,
1 - (5 - hexadecoxy - 2 - pentenyl) - 3 - (2 - ethylhexyl) pyridinium chloride,
1 - (5 - heptadecoxy - 2 - pentenyl) - 2,4 - dioctylpyridinium chloride,
1-(5-eicosoxy-2-pentenyl)-4-dodecylpyridinium chloride,
1 - (5 - eicosoxy - 2 - pentenyl) - 2 - ethyl - 5 - dodecylpyridinium chloride, and the corresponding bromide, fluoride, and iodide quaternary compounds.

The novel pyridine quaternary compounds of the instant invention can be produced by the reaction of a suitable pyridine compound with a suitable alkoxy-substituted halopentene.

The pyridine compounds which can be employed as starting materials in preparing the novel pyridine quaternary compounds of the instant invention can be graphically depicted by the formula

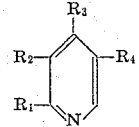

wherein $R_1$, $R_2$, $R_3$ and $R_4$ are as above defined. Illustrative of such starting materials is 2-methyl-5-ethylpyridine which can be represented by the formula

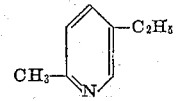

and such material as pyridine, 2-methylpyridine, 3-methylpyridine, 4-methylpyridine, 2,5-dimethylpyridine, 3,5-dimethylpyridine, 2,4-dimethylpyridine, 4-n-propylpyridine, 2-methyl-5-n-butylpyridine, 3-ethylpyridine, 4-isopropylpyridine, 3-hexylpyridine, 3-(2-ethylhexyl)pyridine, 4-dodecylpyridine, 2-octylpyridine, 2,5-dihexylpyridine, 2,4-dioctylpyridine, 2-ethyl-5-dodecylpyridine, and the like.

The alkoxy-substituted halopentenes which can be employed as starting materials in preparing the novel pyridine quaternary compounds of the instant invention can be either a 1-halo-2-pentene or a 3-halo-1-pentene, and can be graphically depicted by the formula $$CH_2XCH=CHCH_2CH_2OR_6$$

or $$CH_2=CHCHXCH_2CH_2OR_6$$

wherein X and $R_6$ are as above defined. Illustrative of such starting materials is 1-chloro-5-decoxy-2-pentene which can be represented by the formula $$CH_2ClCH=CHCH_2CH_2OC_{10}H_{21}$$

and 3-chloro-5-decoxy-1-pentene which can be represented by the formula $$CH_2=CHCHClCH_2CH_2OC_{10}H_{21}$$

and such materials as 1-chloro-5-methoxy-2-pentene,
3-chloro-5-methoxy-1-pentene,
1-chloro-5-(2-ethylbutoxy)-2-pentene,
3-chloro-5-(2-ethylbutoxy)-1-pentene,
1-chloro-5-(2-ethylhexoxy)-2-pentene,
3-chloro-5-(2-ethylhexoxy)-1-pentene,
1-chloro-5-ethoxy-2-pentene,
3-chloro-5-ethoxy-1-pentene,
1-bromo-5-decoxy-2-pentene,
3-bromo-5-decoxy-1-pentene,
1-fluoro-5-methoxy-2-pentene,
3-fluoro-5-methoxy-1-pentene,
1-iodo-5-(2-ethylbutoxy)-2-pentene,
3-iodo-5-(2-ethylbutoxy)-1-pentene,
1-bromo-5-(2-ethylhexoxy)-2-pentene,
3-bromo-5-(2-ethylhexoxy)-1-pentene,
1-fluoro-5-ethoxy-2-pentene,
3-fluoro-5-ethoxy-2-pentene,
1-chloro-5-[4-(2,6,8-trimethylnonoxy)]-2-pentene,
3-chloro-5[4-(2,6,8-trimethylnonoxy)]-1-pentene,
1-chloro-5-dodecoxy-2-pentene,
3-chloro-5-dodecoxy-1-pentene,
1-chloro-5-hexadecoxy-2-pentene,
3-chloro-5-hexadecoxy-1-pentene,
1-chloro-5-heptadecoxy-2-pentene,
3-chloro-5-heptadecoxy-1-pentene,
1-chloro-5-eicosoxy-2-pentene,
3-chloro-5-eicosoxy-1-pentene,
and the like.

When a 3-halo-1-pentene is employed as a starting material in preparing the novel pyridine quaternary compounds of the instant invention, it has been found that rearrangement sometimes occurs with the double bond shifting from the 1-position to the 2-position. Thus the product of the reaction is the same as the product produced when a 1-halo-2-pentene is employed as a starting material. It is not known whether rearrangement occurs in all instances, but when 2-methyl-5-ethylpyridine is reacted with 1-chloro-5-methoxy-2-pentene or 3-chloro-5-methoxy-1-pentene, the product is 1-(5-methoxy-2-pentenyl)-2-methyl-5-ethylpyridinium chloride in both instances.

The compounds which can be employed as starting materials in preparing the novel pyridine quaternary compounds of the instant invention are known materials and can be prepared in accordance with procedures customarily employed for preparing such compounds.

When effecting reaction according to the process of the instant invention, it is preferable to employ equimolar proportions of reactants. However, greater or lesser amounts of either reactant, for example amounts of pyridine compound ranging from as little as 0.1 mole to as much as 10 moles, per mole of alkoxy-substituted halopentene present, can also be employed.

Reaction according to the process of the instant invention readily occurs at temperatures ranging from as low as 60° C. to as high as 200° C., but is preferably effected at temperatures ranging from about 80° C. to about 120° C.

Atmospheric pressure is usually employed in effecting reaction according to the process of the instant invention. However, pressures both above and below atmospheric pressure, for example, pressures ranging from as low as 1 mm. Hg to as high as 100 atmospheres, can be employed whenever it is desirable to do so.

The novel pyridine quaternary compounds of the instant invention are useful as antistatic agents, wetting agents, and fly repellents.

The following examples are set forth for purposes of illustration so that those skilled in the art may better understand this invention, and it should be understood that they are not to be construed as limiting this invention in any manner.

EXAMPLE I

*Preparation of 1-(5-Decoxy-2-Pentenyl)-2-Methyl-5-Ethylpyridinium Chloride*

An admixture of 780 grams (2.68 moles) of a crude mixture of 1-chloro-5-decoxy-2-pentene and 3-chloro-5-decoxy-1-pentene (prepared by the reaction of 1,3-butadiene with chloromethyl decyl ether), and 325 grams of 2-methyl-5-ethylpyridine (2.68 moles) was prepared and heated with stirring at a temperature of 120° C. for six hours. At the end of this time, the mixture was cooled to 70° C. and 2500 milliliters of petroleum ether was added. The resulting mixture was stirred for one-half hour at a temperature of 70° C. After the mixture had cooled to room temperature, the petroleum ether was decanted and the residue was dried by heating at a temperature of 70° C. under a pressure of 2 millimeters Hg for three hours. The dried material was a viscous, brown oil which weighed about 690 grams, and consisted of 1-(5-decoxy-2-pentenyl)-2-methyl-5-ethylpyridinium chloride with 4.4 percent by weight of 2-methyl-5-ethylpyridine hydrochloride present as an impurity (as determined by titration with sodium hydroxide using phenolphthalein as an indicator). This represented a yield of 1-(5-decoxy-2-pentenyl)-2-methyl-5-ethylpyridinium chloride of 64 percent based on 2-methyl-5-ethylpyridine. The 1-(5-decoxy-2-pentenyl)-2-methyl-5-ethylpyridium chloride was identified by chemical analysis. *Analysis.*—Calculated for $C_{23}H_{40}ClNO$: N, 3.67%. Found: N, 3.43%.

EXAMPLE II

*Preparation of 1-(5-Methoxy-2-Pentenyl)-2-Methyl-5-Ethylpyridinium Chloride*

An admixture of 13.45 grams of 1-chloro-5-methoxy-2-pentene (0.1 mole, prepared by the reaction of 1,3-butadiene and chloromethyl methyl ether) and 12.10 grams of 2-methyl-5-ethylpyridine (0.1 mole) was prepared and heated with stirring at a temperature of from 100° C. to 130° C. for three hours. At the end of this time, the reaction mixture was washed five times with petroleum ether and dried under vacuum. The dried material was a viscous brown oil which weighed 24.6 grams, and consisted of 1-(5-methoxy-2-pentenyl)-2-methyl-5-ethylpyridinium chloride with about 4.5 percent by weight of 2-methyl-5-ethylpyridine hydrochloride present as an impurity (as determined by titration with sodium hydroxide using phenolphthalein as an indicator). This represented a yield of 1-(5-methoxy-2-pentenyl)-2-methyl-5-ethylpyridinium chloride of 92 percent of theoretical. The 1-(5-methoxy-2-pentenyl)-2-methyl-5-ethylpyridinium chloride was identified by chemical analysis. *Analysis.*—Calculated for $C_{14}H_{22}ClNO$: N, 5.48%; Cl, 13.86%. Found: N, 5.45%; Cl, 14.01%.

EXAMPLE III

*Preparation of 1-(5-Methoxy-2-Pentenyl)-2-Methyl-5-Ethylpyridinium Chloride*

An admixture of 13.45 grams of 3-chloro-5-methoxy-1-pentene (0.1 mole, prepared by the reaction of 1,3-butadiene and chloromethyl methyl ether) and 12.10 grams of 2-methyl-5-ethylpyridine (0.1 mole) was prepared and heated with stirring at a temperature of from 100° C. to 130° C. for twenty-two hours. At the end of this time, the reaction mixture was washed five times with petroleum ether and dried under vacuum. The dried material was a viscous brown oil which weighed 24.0 grams, and consisted of 1-(5-methoxy-2-pentenyl)-2-methyl-5-ethylpyridinium chloride with about 9.7 percent by weight of 2-methyl-5-ethylpyridine hydrochloride present as an impurity (as determined by titration with sodium hydroxide using phenolphthalein as an indicator). This represented a yield of 1-(5-methoxy-2-pentenyl)-2-methyl-5-ethylpyridinium chloride of 85 percent of theoretical. The infrared absorption spectrum of the product was very similar to the infrared absorption spectrum of the product of Example II.

EXAMPLE IV

*Preparation of 1-[5-(2-Ethylbutoxy)-2-Pentyl]-2-Methyl-5-Ethylpyridinium Chloride*

An admixture of 61.5 grams (0.3 mole) of a mixture of 1-chloro-5-(2-ethylbutoxy)-2-pentene and 3-chloro-5-(2-ethylbutoxy)-1-pentene (prepared by the reaction of 1,3-butadiene and chloromethyl 2-ethylbutyl ether), and 36.3 grams of 2-methyl-5-ethylpyridine (0.3 mole) was prepared and heated with stirring at a temperature of 115° C. for six hours. At the end of this time, the mixture was cooled to 30° C., washed four times with petroleum ether, and dried under vacuum. The dried material was a gray solid which weighed 87 grams, and consisted of 1-[5-(2-ethylbutoxy)-2-pentyl]-2-methyl - 5 - ethylpyridinium chloride with about 5.9 percent by weight of 2-methyl-5-ethylpyridine hydrochloride present as an impurity (as determined by titration with sodium hydroxide using phenolphthalein as an indicator). This represented a yield of 1-[5-(2-ethylbutoxy)-2-pentyl]-2-methyl - 5 - ethylpyridinium chloride of 80 percent of theoretical.

Seventy-three grams of the product was dissolved in 300 milliliters of methanol. The resulting mixture was neutralized with 56 milliliters of 0.5 N aqueous sodium hydroxide solution. The water and methanol present in the mixture were removed by distillation, and the residue was dissolved in 300 milliliters of acetone. The resulting mixture was then filtered (to remove sodium chloride), and acetone was removed therefrom by distillation. The residue was dried under vacuum, and 64 grams of 1-[5-(2-ethylbutoxy)-2-pentyl]-2-methyl-5-ethylpyridinium chloride were obtained. The product was identified by chemical analysis. *Analysis.*—Calculated for $C_{19}H_{32}ClNO$: N, 4.30%; Cl, 10.90%. Found: N, 4.29%; Cl, 10.87%.

EXAMPLE V

*Preparation of 1-[5-(2-Ethylhexoxy)-2-Pentyl]2-Methyl-5-Ethylpyridinium Chloride*

An admixture of 23.25 grams (0.1 mole) of a mixture of 1-chloro-5-(2-ethylhexoxy)-2-pentene and 3-chloro-5-(2-ethylhexoxy)-1-pentene, and 12.10 grams of 2-methyl-5-ethylpyridine (0.1 mole) was prepared and heated with stirring at a temperature of from 110° C. to 120° C. for four hours. At the end of this time, the reaction mixture was washed with petroleum ether and dried under vacuum. The dried material weighed 22.4 grams, and consisted of 1-[5-(2-ethylhexoxy)-2-pentyl]-2-methyl-5-ethylpyridinium chloride with about 3.2 percent by weight of 2-methyl-5-ethylpyridine hydrochloride present as an impurity (as determined by titration with sodium hydroxide using phenolphthalein as an indicator). This represented a yield of 1-[5-(2-ethylhexoxy) - 2 - pentyl]-2-methyl-5-ethylpyridinium chloride of 61 percent of theoretical. The 1-[5-(2-ethylhexoxy)-2-pentyl]-2-methyl - 5 - ethylpyridinium chloride was identified by chemical analysis. *Analysis.*—Calculated for $C_{21}H_{36}ClNO$: N, 3.96%, Cl, 10.02%. Found: N, 3.98%; Cl, 9.72%.

EXAMPLE VI

*Preparation of 1-{5-[4-(2,6,8-Trimethylnonoxy)]-2-Pentyl}-2-Methyl-5-Ethylpyridinium Chloride*

An admixture of 825 grams (2.86 moles) of a mixture of 1-chloro-5-[4-(2,6,8-trimethylnonoxy)]-2-pentene and 3-chloro-5-[4-(2,6,8-trimethylnonoxy)] - 1 - pentene (prepared by the reaction of 1,3-butadiene and chloromethyl 4-(2,6,8-trimethylnonyl)ether), and 313 grams of 2-methyl-5-ethylpyridine (2.58 moles) was prepared and heated with stirring at a temperature of from 115° C. to 123° C. for eighteen hours. At the end of this time, the reaction mixture was neutralized with a solution of 27 grams of sodium hydroxide dissolved in 200 milliliters of water. After the addition of 40 grams of charcoal, the reaction mixture was steam distilled to remove unreacted starting materials. The mixture was then filtered and water was removed from the filtrate by vacuum distillation. The residue was dissolved in 500 milliliters of acetone, and filtered (to remove sodium chloride). The filtrate was then distilled to remove acetone. The residue was a brown viscous oil of 1-{5-[4-(2,6,8-trimethylnonoxy)]-2-pentyl}-2-methyl-5-ethylpyridinium chloride which weighed 682 grams. This represented a yield of 1 - {5-[4-(2,6,8-trimethylnonoxy)]-2-pentyl}-2-methyl-5-ethylpyridinium chloride of 65 percent of theoretical.

EXAMPLE VII

*Use of 1-{5-[4-(2,6,8-Trimethylnonoxy)]-2-Pentyl}-2-Methyl-5-Ethylpyridinium Chloride to Repel Stable Flies*

A 2.5 percent by weight solution of 1-{5-[4-(2,6,8-trimethylnonoxy)]-2-pentyl}-2-methyl - 5 - ethylpyridinium chloride in acetone was prepared, and applied to a thin porous animal membrane. The membrane was allowed to stand for 24 hours, and then placed in contact with warmed citrated beef blood. When a swarm of stable flies (*Stomoxys calcitrans*) were introduced into the vicinity of the membrane, none of the flies attempted to feed through the membrane.

What is claimed is:

1. 1-(5-methoxy - 2 - pentyl)-2-methyl-5-ethylpyridinium chloride.
2. 1-(5-decoxy - 2 - pentyl)-2-methyl-5-ethylpyridinium chloride.
3. 1-[5-(2-ethylbutoxy - 2 - pentyl]-2-methyl-5-ethylpyridinium chloride.
4. 1-[5-(2-ethylhexoxy) - 2 - pentyl]-2-methyl-5-ethylpyridinium chloride.
5. 1-{5-[4-(2,6,8 - trimethylnonoxy)] - 2 - pentyl}-2-methyl-5-ethylpyridinium chloride.
6. Pyridine quaternary compound of the formula:

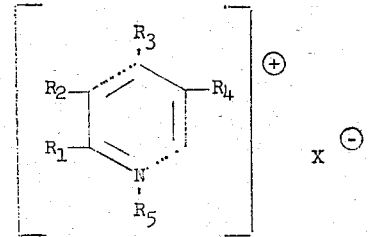

wherein X is a halogen; $R_1$, $R_2$, $R_3$ and $R_4$ are members selected from the group consisting of hydrogen and alkyl of from one to twelve carbon atoms; and $R_5$ is a radical of the group consisting of those of the formula $$-CH_2CH=CHCH_2CH_2OR_6$$

and those of the formula

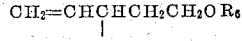

wherein $R_6$ is alkyl of from one to twenty carbon atoms.

References Cited in the file of this patent

UNITED STATES PATENTS

| | | |
|---|---|---|
| 2,256,959 | Muskat | Sept. 23, 1941 |
| 2,295,504 | Shelton | Sept. 8, 1942 |
| 2,349,752 | Pollack | May 23, 1944 |
| 2,865,911 | Nielsen et al. | Dec. 23, 1958 |